(12) United States Patent
Stojanovski

(10) Patent No.: US 6,301,977 B1
(45) Date of Patent: Oct. 16, 2001

(54) VEHICLE SEAT BELT TRANSDUCER FOR CHILD'S SEAT

(76) Inventor: Stojan Stojanovski, 1950 Birchwood, Troy, MI (US) 48084

( * ) Notice: Subject to any disclaimer, the term of this patent is extended or adjusted under 35 U.S.C. 154(b) by 0 days.

(21) Appl. No.: 09/563,646

(22) Filed: May 2, 2000

(51) Int. Cl.⁷ .................................................. G01L 1/26
(52) U.S. Cl. ........................................... 73/862.393
(58) Field of Search ................. 73/826, 828, 862.391, 73/862.392, 862.393

(56) References Cited

U.S. PATENT DOCUMENTS

| | | | |
|---|---|---|---|
| 3,817,093 | 6/1974 | Williams | 73/144 |
| 4,457,251 * | 7/1984 | Weman et al. | 116/212 |
| 5,026,093 * | 6/1991 | Nishikaji | 280/807 |
| 5,333,902 * | 8/1994 | Hatfield | 280/733 |
| 5,785,347 | 7/1998 | Adolph et al. | 280/735 |
| 5,851,026 | 12/1998 | Schoos et al. | 280/735 |
| 5,865,463 | 2/1999 | Gagnon et al. | 280/735 |
| 5,965,827 * | 10/1999 | Stanley et al. | 73/862.391 |
| 5,991,676 | 11/1999 | Podoloff et al. | 701/45 |
| 5,996,421 | 12/1999 | Husby | 73/862.451 |
| 6,081,759 * | 6/2000 | Husby et al. | 701/45 |

* cited by examiner

Primary Examiner—Max Noori
(74) Attorney, Agent, or Firm—Charles W. Chandler

(57) ABSTRACT

Apparatus for suppressing the operation of a vehicle restraint system when a child's seat is mounted in a vehicle car seat. The seat belt is connected by two plates to a vehicle anchor. One plate is stretchable, the other non-stretchable. A low seat belt load does not stretch either plate. A higher load stretches the stretchable plate until the belt load is transferred to the non-stretchable plate.

11 Claims, 4 Drawing Sheets

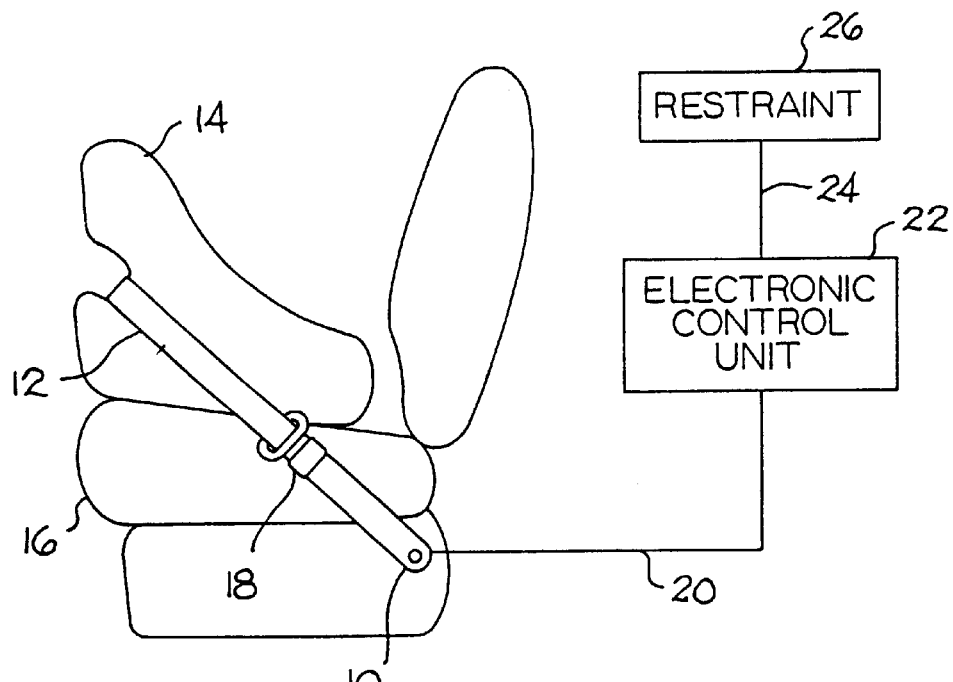
FIG. 1
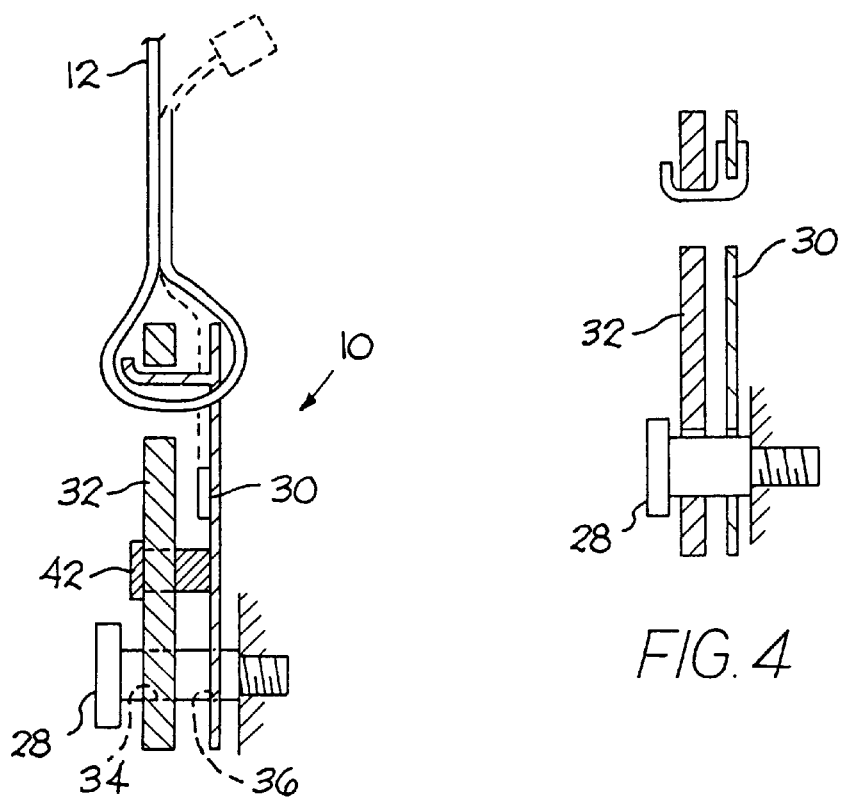
FIG. 2
FIG. 4

VEHICLE SEAT BELT TRANSDUCER FOR CHILD'S SEAT

BACKGROUND AND SUMMARY OF THE INVENTION

This invention is related to a child seat sensing means in a motor vehicle, and more particularly to apparatus disabling the airbag system for a car seat supporting a child's seat.

Recent government regulations for child restraint's and airbag suppression necessitate a low cost integral load sensor.

A load sensor can be used with automobile onboard electronic logic to store seat belt forces for accident investigations, and for the development of load limiting devices to reduce injury to the vehicle occupants.

A load transducer can also be used to determine if the load is high enough to warrant the replacement of the seat belt. Visual inspection of the seat belt is the only means used by manufacturers today to replace the belt.

A load transducer can also be used with electronically controlled seat belt load limiters to control the maximum seat belt force a particular sized person should receive before the restraint system, such as an airbag system, is deployed or energized.

Typically, seat belts strapped around an adult have a small retraction force when the adult is buckled up. However, a properly secured child seat mounted on the same car seat will provide a relatively high tensile load upon the lap belt.

Some prior art devices related to these problems include: U.S. Pat. No. 5,996,421 issued Dec. 7, 1999, to Harald Snorre Husby for "Seat Belt Tension Sensor Employing Flexible Potentiometer"; U.S. Pat. No. 5,991,676 issued Nov. 23, 1999, to Robert Michael Podoloff and Ronald Anthony Vallette, Jr. for "Seat Occupant Sensing System"; U.S. Pat. No. 5,865,463 issued Feb. 2, 1999, to Gagnon et al. for "Airbag Deployment Controller"; U.S. Pat. No. 5,851,026 issued Dec. 22, 1998, to Aloyse Schoos and Michael White for "Method and Installation for Detecting Certain Parameters Concerning an Auxiliary Child Seat with a View to Controlling the Operation of the Airbags of a Vehicle"; U.S. Pat. No. 5,785,347 issued Jul. 28, 1998, to Adolph et al. for "Occupant Sensing and Crash Behavior System"; and U.S. Pat. No. 3,817,093 issued Jun. 18, 1974, to Charles W. Williams for "Seat Belt Webbing Tension Measuring Device".

Anticipated laws require that passenger side seat airbags be suppressed when a child seat is present.

The preferred embodiment of the invention comprises a seat belt transducer, which compensates for the tensile force applied by the belt to a properly fastened child seat. The seat belt tension information is sent to the electronic control module (ECM). The ECM then disables the airbag system if a child's seat is strapped on a car seat.

The preferred embodiment of the invention comprises a transducer having a transducer plate mounted and secured parallel to a steel structural plate. Both plates are connected to an anchor device attached to the vehicle frame. Both plates have a belt opening for receiving a belt loop. However, the belt openings are offset so that a light load on the seat belt is applied only to the transducer plate.

The transducer plate is elongated within its elastic limits under a tensile load. Thus an initial tensile load applied by the belt, such as caused by a strapped down child's seat, will be connected through the transducer plate to the anchor device.

Tension in the transducer plate is converted to an electrical signal by a strain gage. This reading is sent to the ECM, which determines from the tension on the seat belt whether or not the airbag system is to be inflated.

In the event of a high-speed accident, the transducer plate stretches until the belt-receiving openings in the two plates are aligned, at which time the primary belt load passes through the structural plate instead of the transducer plate. A strain gage is mounted on the transducer plate to transmit a signal that is proportional to the strain, to the ECM.

The transducer plate also has an integral web protector that prevents tearing of the seat belt. The wire to the strain gage is routed from the strain gage around the belt opening and up the belt webbing. The seat belt webbing protects the strain gage wire and presents a clean appearance.

Still further objects and advantages of the invention will become readily apparent to those skilled in the art to which the invention pertains, upon reference to the following detailed description.

DESCRIPTION OF THE DRAWINGS

The description refers to the accompanying drawings in which like reference characters refer to like parts throughout the several views, and in which:

FIG. 1 is a view of a child seat anchored to a car seat structure, with an airbag restraint means and electronic control means illustrated schematically;

FIG. 2 is an enlarged sectional view showing the two plates;

FIG. 4 shows the manner in which the two plates are mounted, illustrating the transducer plate under load;

DESCRIPTION OF THE PREFERRED EMBODIMENT

Figure 3:
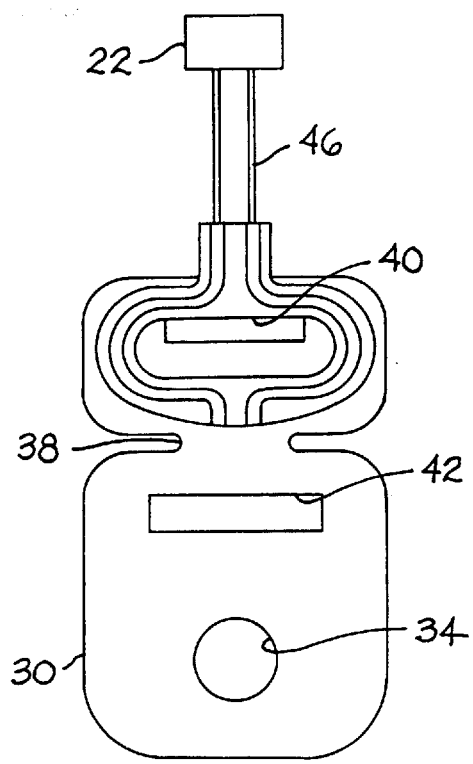
FIG. 3 is a view of the stretchable transducer plate.

FIG. 1 illustrates a preferred transducer 10 connected to a seat belt 12 employed for strapping a child's seat 14 on a car seat 16. The seat belt employs buckle apparatus 18 for connecting the two halves of the seat belt together.

The transducer is electrically connected by wire connector means 20 to an electronic control unit 22 which, in turn, is connected by wire connector means 24 to a electrically actuated restraint 26. Restraint 26, for illustrative purposes, is an inflatable airbag intended to be inflated during the course of a collision unless the child's seat is sensed as being mounted on car seat 16.

Seat belt 12 is connected by transducer 10 to anchor bolt 28, which is rigidly connected to the vehicle frame, not shown. The transducer comprises an elastically elongated transducer plate 30, which is a juxtaposed with respect to a rigid structural metal plate 32.

Figure 6:
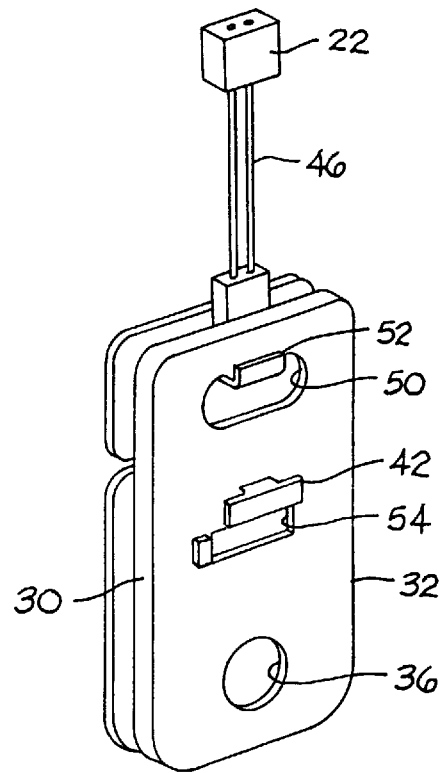
FIG. 6 illustrates the transducer plate mounted on the structural plate.
Figure 5:
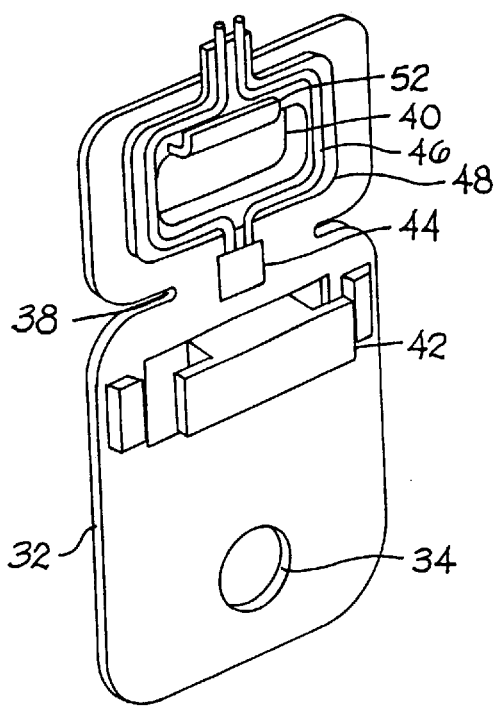
FIG. 5 is another view of the transducer plate.

The transducer plate 30, as can be seen in FIGS. 3, 5, and 6, has a bottom opening 34 for receiving anchor bolt 28. Structural plate 32 also has an opening 36 which is aligned with opening 34 of the transducer plate and mounted on anchor bolt 28.

Referring to FIG. 3, the transducer plate is relatively wide but has a reduced width forming a neck 38 which forms a relatively weak, stretchable part of the plate between the seat belt and the anchor. The upper end of the transducer plate also has a belt-receiving opening 40. The transducer plate is preferably formed of a lightweight, deformable sheet metal material, or perhaps a plastic material, which tends to elongate under a tensile force in a predictable manner. The transducer plate is adapted to be elongated by a tensile force applied by the belt, which passes through the plate, pulling against anchor bolt 28.

A tongue 42 is mounted in the mid section of the transducer plate beneath neck 38.

Referring to FIG. 5, a strain gage 44 is attached to the transducer plate and connected by electrically conductive wires 46 which are mounted around belt-receiving opening 40, preferably in a plastic container 48. Wires 46 then pass upwardly to electronic control unit 22.

The strain gage transmits an electrical signal to electronic control unit 22 to disable the airbag if the initial preload on the belt is consistent with the strapping load on the child's seat.

Structural plate 32 has a belt-receiving slot 50, which is slightly offset from the belt-receiving opening 40 of the transducer plate. When the two plates are mounted on the anchor bolt, the transducer belt-receiving opening is closer to the anchor bolt than slot 50 in the structural plate.

The transducer plate also has a second tongue 52 that is received through opening 50. Tongue 42 is received through a lower opening 54 in the structural plate so that the two plates snap together to form an assembly.

The arrangement is such that when an initial load is applied on the belt by fastening the belt around a child's seat, the belt load is applied to the transducer plate. This arrangement also functions if the child's seat is not mounted on the car seat, but the seat belt is strapped to an adult, not shown. If the belt is strapped around a child's seat to apply a belt initial tension, for example 50 pounds, the electronic control unit will then sense that the child's seat is strapped by the seat belt, and therefore suppress the operation of the restraint 26 or airbag system.

On the other hand, if an adult is sitting in the seat so that initially there is a very small, predetermined tensile load on the belt, the preliminary load will also be applied to the transducer plate. In the event of a collision, the tensile force of the belt applied by a moving adult will cause the transducer plate to elongate until the two belt-receiving openings 40 and 50 are aligned. At this point, the belt will apply the tensile load on the structural plate, which is rigid and non-yielding. Restraint 26 will then be energized by the strain gage to provide a safety device for the adult.

Figure 7:
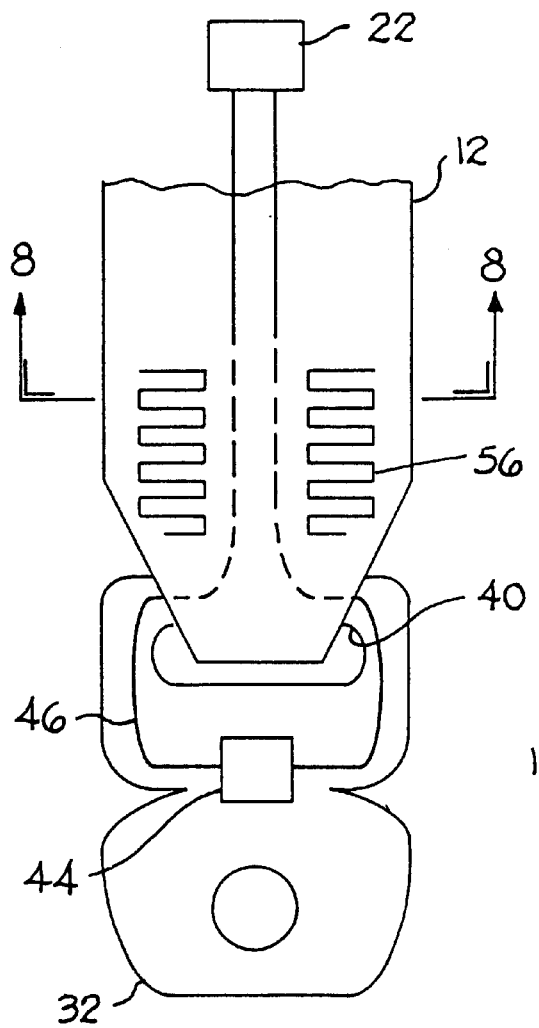
FIG. 7 is a view of an option for mounting the wiring in the seat belt webbing.
Figure 8:
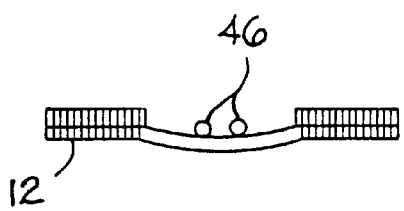
FIG. 8 is a view as seen along FIGS. 8—8 of FIG. 7.

FIG. 7 illustrates an option for attaching strain gage wires 46 to the seat belt 12. In this case the wires are routed around web slot 40 and then through the belt loop, formed by stitching 56.

Figure 9:
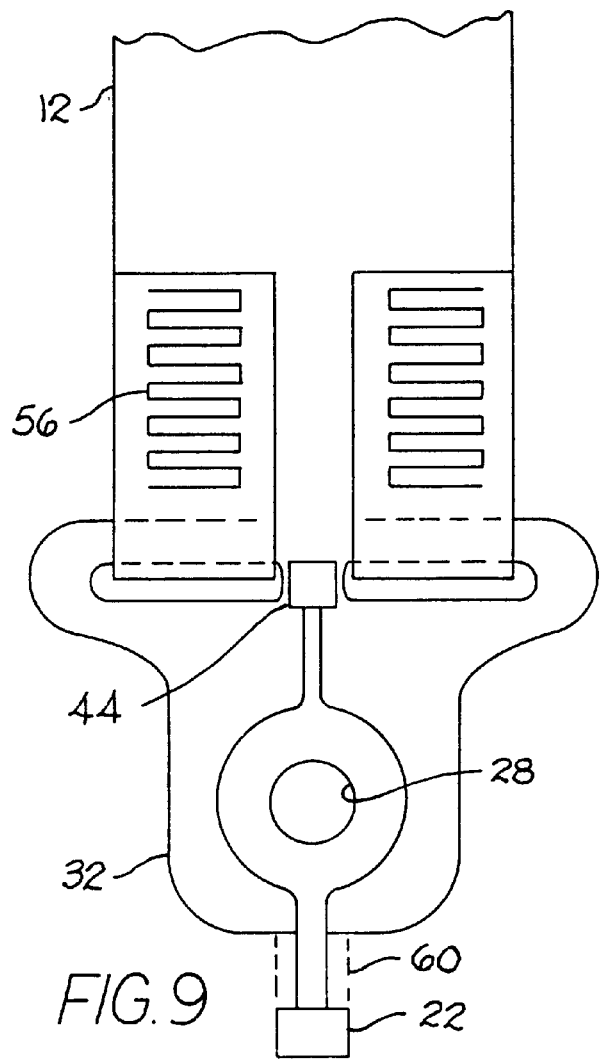
FIG. 9 is a view of another option for mounting the transducer wiring.

Another option is illustrated in FIG. 9 in which belt 12 is connected to a modified transducer plate 32'. The wires pass from the strain gage 44 down and around anchor bolt 28 and then into a molded wire track 60 to electronic control unit 22.

Other options are possible.

It is to be understood that I have described an improved transducer for detecting whether a child's seat is mounted on a car seat. In the event, the tension on the belt indicates that a child's seat is mounted on the car seat, then the strain gage will send a signal to the electronic control unit, suppressing activation of the airbag system.

A second option of the use of the transducer may be to sense a sufficiently high tensile force on the belt consistent with the presence of a large adult. The air bag system will then be activated to provide a maximum or higher level of protection in the event of an accident above a set threshold.

Figure 10:
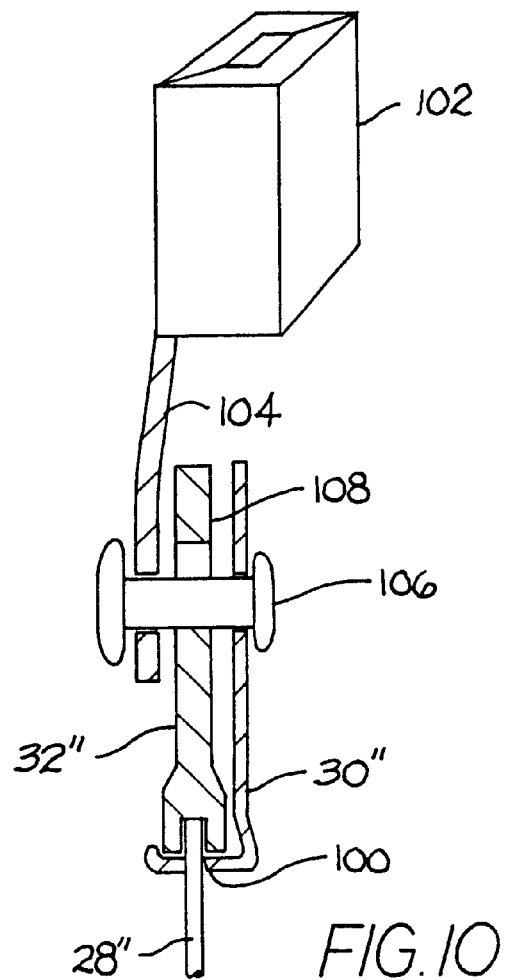
FIG. 10 is a view of the transducer anchored to the vehicle by a cable.

FIG. 10 illustrates another embodiment of the invention in which the structural plate 32' is connected by a cable 28" rather than a bolt 28. The transducer plate has its lower edge wrapped around the lower edge of the structural plate by lip means 100. Similarly, a seat belt buckle 102 is connected by a plate 104 to a bolt 106. Bolt 106 connects plate 104 to both structural plate and the transducer plate in such a manner that when the transducer plate is stretched by the buckle, that is by an upward load, the load of the buckle will be transmitted to the transducer plate when it is raised to the top of a slot 108.

Figure 11:
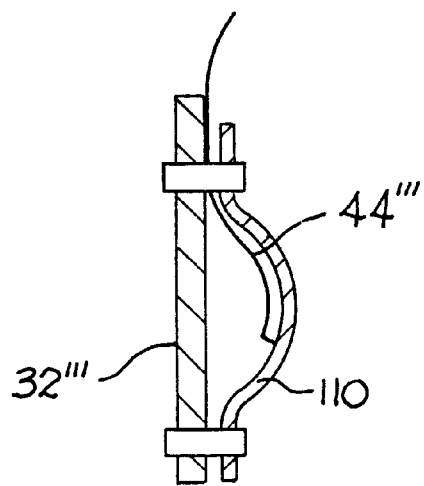
FIG. 11 is a view of a transducer plate having a bold neck area for supporting the strain gage.

FIG. 11 illustrates another variation of the invention in which the transducer plate 32'" is connected to the transducer plate so as to form a bow 110 at the neck portion of the transducer plate. Thus as the transducer plate is elongated by a tensile force applied by the seat belt, the load of the seat belt will then be applied to the structural plate when the transducer plate has been elongated. The strain gage 44'" is mounted at the weak point, that is at the bowed neck of the transducer plate.

Having described my invention, I claim:

1. Apparatus for suppressing the operation of a restraint system when a child's seat is mounted and strapped on a car seat in a vehicle, comprising:

a seat belt having a first end arranged to be connected to a child seat to anchor same to a vehicle, and a looped second end;

a belt anchoring structure attached to the vehicle;

a transducer connected between the seat belt and the belt anchoring structure, comprising:

a transducer plate connected to the belt anchoring structure and having opening means for connecting the looped end of the seat belt, the transducer plate being elastically deformable in response to a tensile load applied by the seat belt to the transducer plate;

a rigid structural plate connected to the belt anchoring structure and having opening means for coupling to the looped end of the seat belt and being relatively non-stretchable in response to a tensile load applied by the seat belt;

a strain gage mounted on the transducer plate to transmit an electrical signal when the transducer plate has been deformed by the seat belt; and the transducer plate being disposed to transfer a tensile seat belt load to the structural plate when the transducer plate has been elongated a predetermined amount.

2. Apparatus for anchoring a seat belt in a vehicle, comprising:

a rigid first member having an opening for receiving the looped end of a seat belt and means for connecting the first member to a vehicle anchor means;

a second member which elongates in response to a tensile force, the second member having an opening for receiving the looped end of a seat belt received in the opening of the first member, and means for connecting the second member to the vehicle anchor means; and the belt-receiving opening in the second member being disposed closer to the anchoring means than the belt-receiving opening of the first member such that as the second member elongates in response to a tensile load applied by the seat belt on the second member, but not on the first member, the opening in the second member become so aligned with the opening in the first member that the tensile load is applied to the first member.

3. Apparatus as defined in claim 2, in which the first member is a metal plate.

4. Apparatus as defined in claim 1, in which the first member is a metal plate, and the second member is a metal or plastic deformable plate.

5. Apparatus as defined in claim 2, including a strain gage mounted on the second member between the belt-receiving opening thereon and the anchor means to send an electrical signal to a restraint means.

6. Apparatus as defined in claim 1, including a restraint means electrically connected to the strain gage so as to be disabled unless a predetermined signal is received from the strain gage.

7. Apparatus as defined in claim 1, in which the restraint means is an inflatable airbag.

8. Apparatus as defined in claim 2, including a seat belt connected to the second plate, and electrical wiring connected to the strain gage and embedded in the seat belt.

9. Apparatus as defined in claim 2, in which the second member is a thin, deformable metal or plastic plate.

10. Apparatus as defined in claim 1, in which the belt anchoring structure comprises a steel or nylon cable mounted to the vehicle frame.

11. Apparatus as defined in claim 1, in which the transducer plate has bowed neck area supporting the strain gage.

* * * * *